United States Patent [19]

Shioya et al.

[11] Patent Number: 4,792,694
[45] Date of Patent: Dec. 20, 1988

[54] METHOD AND APPARATUS FOR OBTAINING THREE DIMENSIONAL DISTANCE INFORMATION STEREO VISION

[75] Inventors: Makoto Shioya, Tokyo; Motohisa Funabashi, Sagamihara; Takushi Nishiya, Machida, all of Japan

[73] Assignee: Hitachi, Ltd., Tokyo, Japan

[21] Appl. No.: 853,231

[22] Filed: Apr. 17, 1986

[30] Foreign Application Priority Data

Apr. 17, 1985 [JP] Japan .................. 60-80159

[51] Int. Cl.$^4$ ............................................. G01C 11/12
[52] U.S. Cl. ...................... 250/558; 358/88; 356/12
[58] Field of Search ............... 250/558; 358/88, 3; 356/12, 13, 14

[56] References Cited

U.S. PATENT DOCUMENTS

| | | | |
|---|---|---|---|
| 4,217,602 | 8/1980 | Thomas et al. | 358/3 |
| 4,236,172 | 11/1980 | Krasnoperov | 358/3 |
| 4,259,589 | 3/1981 | DiMatteo et al. | 250/558 |
| 4,506,296 | 3/1985 | Marraud et al. | 358/88 |
| 4,654,872 | 3/1987 | Hisano et al. | 250/558 |

Primary Examiner—David C. Nelms
Assistant Examiner—Jessie Ruoff
Attorney, Agent, or Firm—Antonelli, Terry & Wands

[57] ABSTRACT

A method of forming a three-dimensional stereo vision is disclosed in which, in order to prevent the erroneous detection of an object point in the conventional method using two image focusing lens systems, three image points of an object point formed by logically and/or physically selecting three image focusing lens systems and three image sensing surfaces from a multiplicity of image points on an image sensing surface by using the fact that a positional relation among three image points of the same object point is similar to the positional relation among the three image focusing lens systems, and the positional information of three selected image points on the image sensing surface is used for obtaining three-dimensional distance information of the object point.

28 Claims, 5 Drawing Sheets

METHOD AND APPARATUS FOR OBTAINING THREE DIMENSIONAL DISTANCE INFORMATION STEREO VISION

BACKGROUND OF THE INVENTION

The present invention relates to a visual system, and more particularly to a method of and an apparatus for forming a passive three-dimensional stereo vision which is capable of extracting three-dimensional distance information.

The above method and apparatus are applicable to various fields requiring an accurate, high-speed passive visual system such as an automobile (for the purpose of guiding the automobile when the automobile is driven into a garage, is parked, or runs on a snarl-up road or a highway, and for the purpose of facilitating the navigation of the automobile on an ordinary road), vehicles other than the automobile, a robot, factory automation, laboratory automation, office automation, building automation, home automation, and precise measurement.

In other words, the method and apparatus are used in operatorless repairs, an inspecting operation, an operatorless wagon, and operatorless crane, operatorless construction, civil engineering machinery, the assembly of parts, measurement of the number of queuing persons, a burglar-proof system, a disaster prevention system, a blindman guiding system, a speed detector, a distance detector, an object detector, an automatic focusing mechanism for each of a microscope, an enlarger, a projector, a copying machine, an optical disc apparatus, an image pickup device, a camera and others, character/figure recognition, the recognition of a number plate, a stereoscopic camera (for a still or moving object) and a game/leisure machine.

In a conventional method of forming a three-dimensional stereo vision, two brightness data obtained by two eyes are caused to correspond to each other (that is, corresponding points of the two brightness data are determined) by pattern matching techniques. What is meant by pattern matching techniques is that the scale (namely, measure) of a coordinate space is enlarged or contracted at each of the points in that portion of the coordinate space which has brightness distribution, so that the difference between the brightness distribution in the coordinate space whose scale has been changed and reference brightness distribution becomes minimum under some criterion.

Such pattern matching techniques encounter with two problems, the first one of which is as follows. The number of coordinate points where the scale of the coordinate space is to be enlarged or contracted, is equal to the number of bright points (herein referred to as "bright lines") formed on a sensing surface, and the position of each of the coordinate points can be freely changed, provided that the configurational order of the bright lines is not changed. Accordingly, a vast number of combinations of scale transformation are basically allowed, and a combination capable of minimizing the difference between the brightness distribution obtained after scale transformation and the reference brightness distribution, is selected from a multiplicity of combinations. Thus, it takes a lot of time to carry out pattern matching by digital processing.

The second problem of the pattern matching techniques is as follows. As mentioned above, the scale transformation is made so that the configurational order of the bright lines is not changed. In a case where the brightness distribution at an object system is such that a first group of bright lines which is formed on a sensing surface by the first image focusing lens system, is different in the configurational order of bright lines from the second group of bright lines which is formed on the sensing surface by the second image focusing lens system, pattern patching is attended with a fundamental error. This error is attended for an object system in which the spacing between two object points in the direction of depth is greater than the spacing between the object points in a direction corresponding to the change of longitudinal azimuth angle. It is to be noted that, when the object points and the image focusing lens systems are in the same plane surface, the direction from the image focusing lens systems towards the object points in the above plane surface is herein referred to as "direction of depth", and an angle between the straight line connecting the image focusing lens systems and the straight line connecting one of the image focusing lens systems with one of the object points is herein referred to as a "horizontal azimuth angle". Incidentally, an angle between the above plane surface and the image sensing surface is herein referred to as the "vertical azimuth angle", which will be mentioned later.

In a case where an object system is not formed of independent object points but has continuous spatial distribution, the continuous distribution is converted into discrete distribution to make it possible to use digital processing. Accordingly, this case also encounters the above-mentioned two problems.

Further, even when a large number of brightness distribution data are used for increasing the accuracy of pattern matching, these two problems are unavoidable, provided that the above-mentioned pattern matching techniques are used.

SUMMARY OF THE INVENTION

An object of the present invention is to provide a method of and an apparatus for forming three-dimensional distance information which are able to solve the problems of the prior art and to form a stereo vision in a short time without producing the fundamental error based upon the spatial distribution object points within an object system.

In order to attain the above object, a method of and an apparatus for forming three-dimensional distance information in accordance with the present invention uses three or more image focusing lens systems. In more detail, in the above mentioned and apparatus, special attention is paid to the fact that a special relation exists between the geometrical positional relation among image points (namely, bright lines) of the same object point which are formed on a sensing surface by three or more image focusing lens systems, and the geometrical positional relations among the image focusing lens systems themselves and between the sensing surface and the image focusing lens systems, and bright lines of the same object point are selected from a multiplicity of bright lines on the sensing surface by using a special relation, to eliminate the two problems of the conventional pattern matching techniques.

An example of the above special relation is such that, when three or more image focusing lens systems (for example, eyes) are placed in a plane, and the plane is parallel to an image sensing surface, image points (namely, bright lines) of the same object point which are formed on the sensing surface by the image focusing lens systems, are spaced apart from one another so as to have a geometrical positional relation similar to the geometrical positional relation among the image focusing lens systems. In other words, a figure formed by straight lines which connects the image focusing lens systems is similar to a figure formed by straight lines which connects image points of the same object point. Accordingly, when those ones of the bright lines on the sensing surface which are formed by each of the image focusing lens systems, can be known, for example, when a plurality of sensing areas each corresponding to one of the image focusing lens systems are provided on imaginary planes bright lines which are formed by different image focusing lens systems and have a geometrical positional relation similar to the geometrical positional relation among the image focusing lens systems, can be extracted, as candidates for corresponding points, from a multiplicity of bright lines. (Incidentally, even in a case where a single physical sensing surface is used, if the image focusing lens systems form the image of an object system at different time moments, a plurality of sensing areas will be formed in effect.)

Those candidates for corresponding points which are extracted in the above-mentioned manner, can indicate all of the object points, excepting an object point whose image point is not formed on a sensing surface. Moreover, even in a case where the brightness distribution at the object system is such that the configuration order of bright points which are formed on a sensing surface by one of the image focusing lens systems, is different from the configurational order of bright points which are formed on the sensing surface by another image focusing lens system, the above-mentioned fundamental error is not generated in selecting the candidates.

In some cases, however, a virtual object point which does not exist actually, may be extracted as an object, since bright lines satisfying the above special relation can be found. The probability of extracting the virtual object point can be greatly reduced by increasing the number of image focusing lens systems, disposing image focusing lens systems in a plane at random, or disposing image focusing lens systems in different planes. This is because these countermeasures make conditions for determining corresponding points severe.

All the candidates for corresponding points thus obtained may be used as the corresponding points. In fact, the candidates can be reduced on the basis of brightness data. In general, when it is possible to detect brightness data, color data (namely, data on the frequency characteristics of incident light), data on the phase of incident light, data on the plane of polarization of incident light, and the differential value of each of these data with respect to time or space, these data and their differentiated values can be used for selecting appropriate ones from the candidates. Now, explanation will be made on a case where brightness data is used for reducing the candidates, by way of example. When brightness ratio among bright lines of the same object point which are formed on the sensing surface by the image focusing lens systems is previously known, only corresponding points having the above brightness ratio are extracted. The brightness of each bright line is dependent upon the direction dependence of the reflectivity of the object point and the distance between the object point and the sensing surface. The distance between the object point and the sensing surface has been known when the candidates for the corresponding points are extracted. Accordingly, only corresponding points based upon realistic direction dependence of reflectivity are extracted. In a case where data other than the brightness data is used, corresponding points can be extracted by a method corresponding to the data.

DESCRIPTION OF THE PREFERRED EMBODIMENTS

Figure 1:
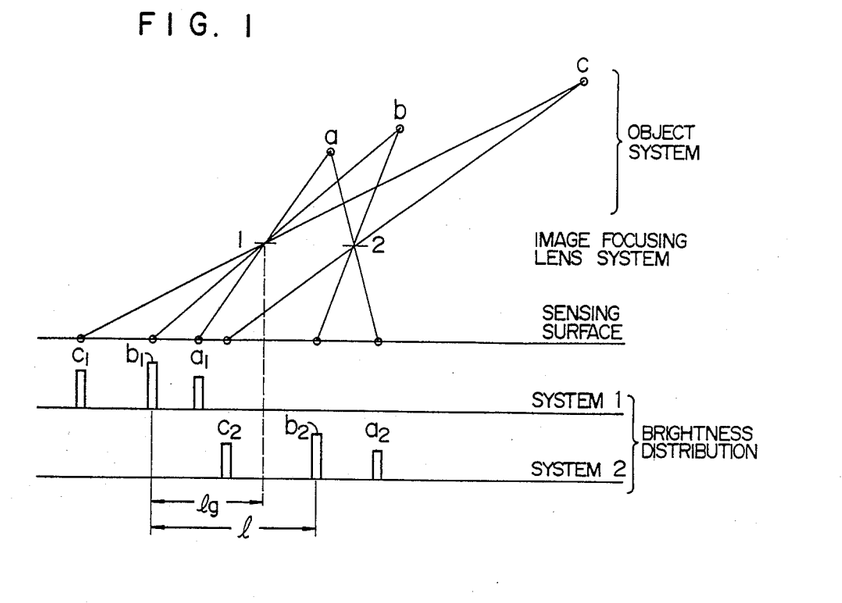
FIG. 1 is a schematic diagram for explaining a method of forming a three-dimensional stereo vision through a conventional pattern matching technique using two brightness data which are obtained by two image focusing lens systems.

In order to facilitate a understanding of the present invention, the prior art will first be explained, by reference to FIGS. 1 and 2. FIG. 1 is a schematic diagram for explaining the pattern matching for two brightness data which are obtained by two image focusing lens systems, and this diagram shows a case where an object system is formed of three object points a, b and c. In the prior art, a first image focusing lens system and a second image focusing lens system are used, and brightness distribution is formed on a sensing surface by each of these image focusing lens systems. Referring to FIG. 1, three points a, b and c which are spaced apart from one another, make up the object system, and the brightness distribution which is formed on the sensing surface by the first image focusing lens system, is the discrete brightness distribution made up of three bright lines a1, b1 and c1. Further, the brightness distribution which is formed on the sensing surface by the second image focusing lens system is the discrete brightness distribution made up of three bright lines a2, b2 and c2. When the bright lines a1, b1, c1, a2, b2 and c2 are obtained, it is determined by some method which of the bright lines obtained by one of the image focusing lens systems corresponds to each of the bright lines obtained by the other image focusing lens system. Then, the distance between the sensing surface and the object system in the direction of depth is determined on the basis of the distance l between corresponding bright lines, and the horizontal azimuth angle is determined on the basis of the distance lg indicating the geometrical positional relation between one image focusing lens system and a bright line formed by this focusing lens system. Three-dimensional distance information with respect to the object system is then obtained by using the above distance in the direction of depth, the above horizontal azimuth angle, and other factors.

In the prior art, the bright lines obtained by the first image focusing lens system are forced to correspond to the bright lines obtained by the second image focusing lens system (that is, corresponding bright lines are determined) by some pattern matching technique. Fundamentally, what is meant by pattern matching techniques is that the scale (namely, measure) of a coordinate space is enlarged or contracted at each of the points in that portion of the coordinate space which has a brightness distribution, so that the difference between the brightness distribution in the coordinate space whose scale has been changed and reference brightness distribution becomes minimum under some criterion. In the case shown in FIG. 1, the change of the scale corresponds to the change of each of the distances between the bright lines a2 and b2 and between the bright lines b2 and c2, that is, the change of the positions of the bright lines a2, b2 and c2 without being attended with a change in the configuration order of these bright lines. It is meant by pattern matching that by changing the positions of the bright lines a2, b2 and c2 in the above manner, the positional relation among the bright lines a2, b2 and c2 becomes equal to the positional relation among the bright lines a1, b1 and c1 (that is, the brightness distribution including the bright lines a2, b2 and c2 becomes entirely equal to the brightness distribution including the bright lines a1, b1 and c1).

Figure 2:
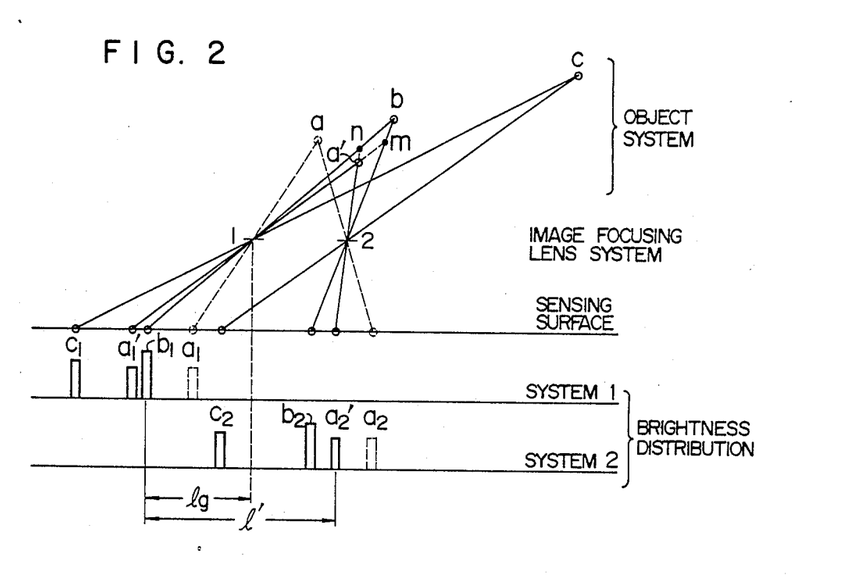
FIG. 2 is a schematic diagram for explaining the generation of a fundamental error in the method of forming a three-dimensional stereo vision through the conventional pattern matching technique.

FIG. 2 is a schematic diagram for explaining the generation of the previously-mentioned fundamental error in a case where an object system includes two object points so that the spacing between the object points in the direction of depth is greater than the spacing between the object points in the direction corresponding to the change of horizontal azimuth angle. Referring to FIG. 2, the object system includes an object point a', instead of the object point a of FIG. 1, and the spacing between the points a' and b in the direction of depth is greater than the spacing between the points a' and b in the direction corresponding to the change of horizontal azimuth angle, to such an extent that the point a' lies between two straight lines which connect the point b with the first and second image focusing lens systems. As shown in FIG. 2, the brightness distribution which is formed on the sensing surface by the first image focusing lens system, is different in the configuration order of bright lines from the brightness distribution which is formed on the sensing surface by the second image focusing lens system. That is, the bright lines formed by the first image focusing lens system are arranged in the order of c1, a'1 and b1. While, the bright lines formed by the second image focusing lens system are arranged in the order of c2, b2 and a'2. When pattern matching is performed for these brightness distribution data, there is a strong probability that the bright line a'1 is forced to correspond to the bright line b2 and the bright line b1 is forced to correspond to the bright line a'2. As a result, the true object points a' and b are not detected from the brightness distribution data on the sensing surface, but the object system is judged to include the false object points m and n. That is, a fundamental error is generated.

Now, a case where pattern matching is performed for brightness distribution data obtained by three image focusing lens systems which are disposed on a straight line parallel to a sensing surface, by utilizing the principle mentioned in "SUMMARY OF THE INVENTION", will be briefly explained by reference to FIG. 3.

Figure 3:
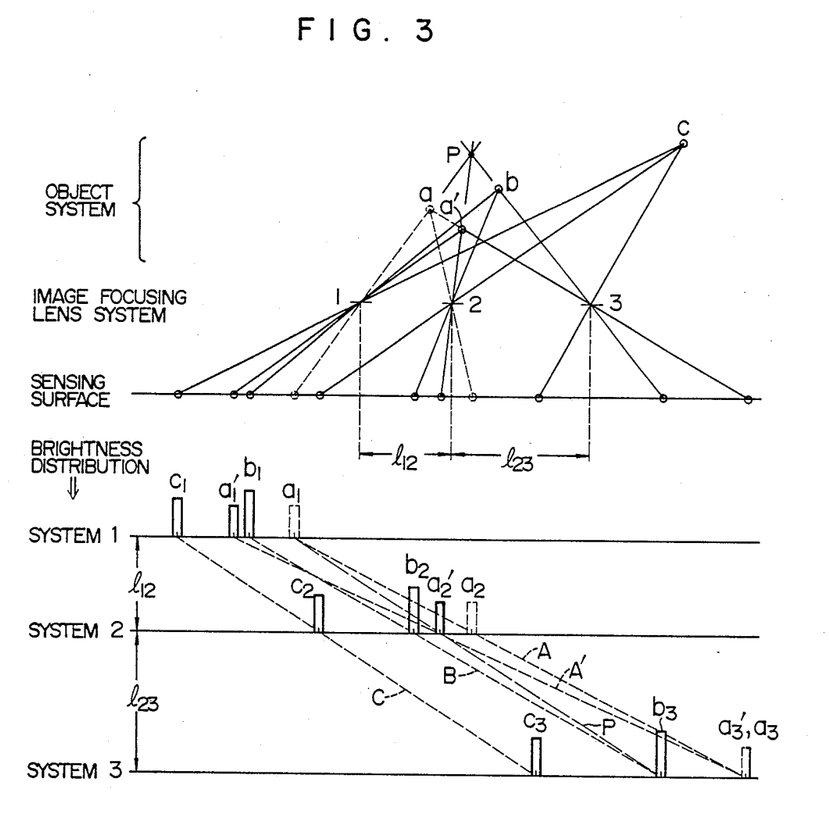
FIG. 3 is a schematic diagram for explaining the principle of a method of forming a three-dimensional stereo vision in accordance with the present invention.

FIG. 3 shows a case where the third image focusing lens system is added to the first and second image focusing lens systems of FIG. 2. In FIG. 3, the first brightness distribution, which is formed on the sensing surface by the first focusing system, is disposed in a first imaginary plane which is spaced apart from a second imaginary plane in which there is disposed the second brightness distribution, which is formed on the sensing surface by the second focusing system, by the distance $l_{12}$ between the first and second focusing systems; and the third brightness distribution, which is formed on the sensing surface by the third focusing system, is disposed in a third imaginary plane which is spaced apart from the second imaginary plane by the distance $l_{23}$ between the second and third focusing systems.

The above arrangement of the first, second and third brightness distribution in respective first, second and third imaginary planes can clearly show a special relation which exists between the geometrical positional relation among bright lines of the same object point which are formed by the focusing systems, and the geometrical positional relations among the focusing systems themselves and between the sensing surface and the focusing systems. In the case of FIG. 3, the special relation is that a ratio of the distance between the first and second ones of three bright lines of the same object point to the distance between the second and third bright lines is equal to a ratio of the distance between the first and second focusing systems to the distance between the second and third focusing systems. Accordingly, when the first brightness distribution formed by the first focusing system, the second brightness distribution formed by the second focusing system and the third brightness distribution formed by the third focusing system are arranged so that the ratio of the distance between the first brightness distribution and the second brightness distribution to the distance between the second brightness distribution and the third brightness distribution is equal to the ratio of the distance $l_{12}$ and the distance $l_{23}$, three bright lines caused by the same object point lie on a straight line.

Conversely, when a group of bright lines lying on the same straight line is found, candidates for corresponding points can be obtained. In FIG. 3, straight lines each indicating corresponding bright lines are expressed by broken lines A, A', B, C and P. One of the above straight lines can be determined in the following manner. That is, when a bright line in the brightness distribution formed by a focusing system (for example, the second focusing system), that is, a bright line in the second brightness distribution is specified, and a bright line is present at each of two positions one of which is spaced apart from the point on the first brightness distribution corresponding to the specified bright line in the leftward direction by a given distance, and the other of which is spaced apart from the point on the third brightness distribution corresponding to the specified bright line in the rightward direction by the distance equal to the product of the given distance and a ratio $l_{23}/l_{12}$, the above-mentioned straight line can be obtained by connecting these positions. The extraction of the above positions in the first and third brightness distribution capable of satisfying the condition with respect to the ratio $l_{23}/l_{12}$ and the AND operation for two pieces of brightness information at the above positions can be readily and rapidly performed by hardware or software.

The remaining straight lines are determined in such a manner that each of the bright lines in the second brightness distribution other than the specified bright line is selected, and the presence of a bright line is confirmed at those positions on the first and third brightness distribution which can satisfy the above-mentioned condition with respect to the ratio $l_{23}/l_{12}$ and another condition that the distance between the selected bright line and the above position on the first brightness distribution is different from the distance between the specified bright line and that position on the first brightness distribution which has a bright line in the preceding processing.

In this case, a vast number of positioning operations are performed on the first, second and third brightness distribution, and the number of positioning operations to be performed is substantially equal to the product of the number of bright lines in the second brightness distribution (that is, the number of object points in a plane which is defined by the focusing systems and bright lines on the actual sensing surface), the number of bright lines in the first or third brightness distribution which are to be combined with the bright lines in the second brightness distribution to determine the distance between the actual sensing surface and each object point in the direction of depth, and the number of bright lines which can be found on the actual sensing surface along a direction corresponding to the change of vertical azimuth angle (that is, a direction parallel to a straight line at which a plane perpendicular to a straight line connecting the first, second and third focusing systems intersects with the actual sensing surface).

Now, let us consider an extreme case where the number of bright lines in each of the first, second and third brightness distribution is equal to the spatial resolving power (namely, resolution). When it is assumed that the resolution is equal in all directions, the number of positioning operations is equal to the cube of the resolution at most.

In a case where the resolution is equal to 500, the number of positioning operations is $125 \times 10^6$. If the positioning operations are performed by serial, digital processing which uses a clock signal of 1 MHz, a processing time proportional to 125 sec will be necessary. If a clock signal of 10 MHz is used, a processing time proportional to 12.5 sec will be required.

In fact, the above positioning operations can be carried out by parallel processing, and thus the processing time can be greatly reduced. For example, brightness distribution data corresponding to those straight lines in an actual sensing surface which are parallel to the straight line connecting the first, second and third focusing systems and are equal in number to the resolution, can be processed at once by parallel processing. Accordingly, the frequency of processing becomes apparently equal to $10^4$. Thus, if the serial, digital processing using a clock signal of 1 MHz is carried out, a processing time proportional to 0.25 sec will be necessary. If the clock signal of 10 MHz is used, a processing time proportional to 0.025 sec. will be required. Further, the positioning operations for one of the second brightness distribution and the first or third brightness distribution can be performed in parallel when a bright line in the other brightness distribution is specified. Thus, the frequency of processing becomes apparently equal to 500. If the serial, digital processing using the clock signal of 1 MHz is used for the above processing, a processing time proportional to 0.5 msec. will be necessary. If the clock signal of 10 MHz is used, a processing time proportional to 0.05 msec. will be required. The pipeline method may be applied to the above 500 processing.

Further, all the possible combinations of positions in the second brightness distribution and positions in the first or third brightness distributions are fundamentally known. Accordingly, all processing can be carried out in parallel. In this case, the processing is apparently carried out only once. Accordingly, if the serial, digital processing using the clock signal of 1 MHz is utilized, the processing time will be in the order of 1 $\mu$s. If the clock signal of 10 MHz is used, the processing time will be in the order of 0.1 $\mu$s.

In a case where an object system is investigated in a limited range of each of the distance in the direction of depth, the horizontal azimuth angle and the vertical azimuth angle, for example, only 10% of each of the second brightness distribution, the first or third brightness distribution and the whole range of vertical azimuth angle, the number of positioning operations is as small as $125 \times 10^3$ even when the parallel processing is not used. Accordingly, if the serial, digital processing using the clock signal of 1 MHz is utilized, the processing time will be about 0.125 sec. If the clock signal of 10 MHz is used, the processing time will be about 0.0125 sec.

Further, let us consider a case where the brightness distribution indicating edges in an object system can be used instead of the brightness distribution indicating object points. When bright lines in the second brightness distribution which indicate edges are 20% of bright lines in the same brightness distribution which indicate object points, bright lines in the first or third brightness distribution which indicate edges are 20% of bright lines in the same brightness distribution which indicate object points, and those bright lines arranged on the actual sensing surface along a direction corresponding to the change of vertical azimuth angle which indicate edges, are 20% of bright lines which are arranged along the above direction and indicate object points, the number of positioning operations is equal to $10^6$. Accordingly, if the serial, digital processing using the clock signal of 1 MHz is utilized, the processing time will be about 1 sec. If the clock signal of 10 MHz is used, the processing time will be about 0.1 sec.

The straight lines for extracting candidates for corresponding points, that is, the broken lines A, A', B, C and P can be determined in the above-mentioned processing time. As can be seen from FIG. 3, the broken lines A, A', B and C correspond to actual object points a, a', b and c, respectively, but an object point p corresponding to the broken line P does not exist actually. The appearance of such a virtual object point is caused by the fact that the bright lines a1, a'2 and b3 are formed on the sensing surface accidentally so that the ratio of the distance between the bright lines a1 and a'2 to the distance between the bright lines a'2 and b3 is equal to the ratio of the distance between the first and second focusing systems to the distance between the second and third focusing systems.

It can be known from FIG. 3 that the possibility of appearance of the virtual object point is greatly reduced by additionally disposing a fourth focusing system at a given position. If the fourth focusing system is disposed on the straight line connecting the first, second and third focusing systems, the reduction of the above possibility will be readily seen from FIG. 3.

Further, it can be supposed that the possibility of appearance of the virtual object point is reduced by changing the geometrical arrangement of the first, second and third focusing systems, instead of adding the fourth focusing system to these focusing systems. It can be readily seen from FIG. 3 that the above possibility will be reduced, if the first, second and third focusing systems are moved on the straight line connecting these focusing systems so that the ratio of the distance between the first and second focusing systems to the distance between the second and third focusing systems differs from the original ratio $l_{12}/l_{23}$.

Figure 6:
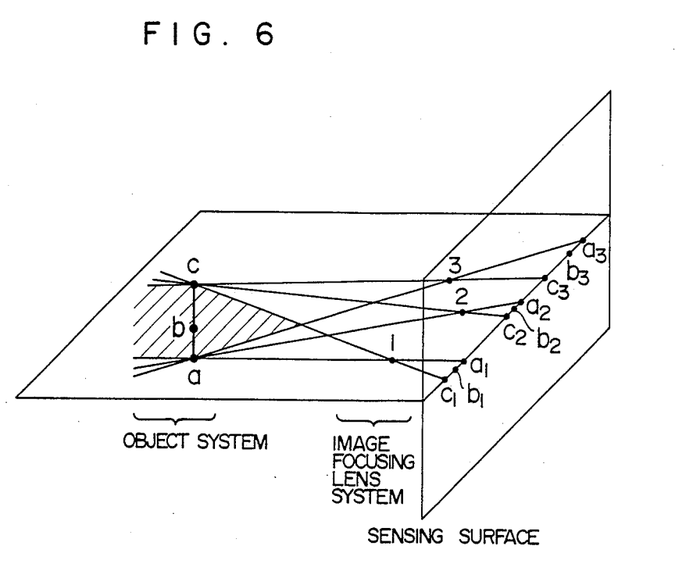
FIGS. 6 and 7 are schematic diagrams for explaining a method of reducing candidates for corresponding points in accordance with the present invention.

An extreme case where a continuous straight line is used as an object system, will be explained below, by reference to FIG. 6. FIG. 6 shows a case where not only a line segment a c which is an object system, but also first, second and third focusing systems are disposed in the same plane. In this case, the image of every point in a common area of three triangular regions each bounded by two straight lines connecting one of the first, second and third focusing systems with both ends of the line segment a c and their extensions, can be formed on a sensing surface by each of these focusing systems. Accordingly, it seems as if an object system were present throughout the above common area, (namely, hatched area). In a case where an object system has a planar shape, a common portion of three conical regions each bounded by a curved surface connecting one of the first, second and third focusing systems with the periphery of the object system and its extension, corresponds to the common area.

Figure 7:
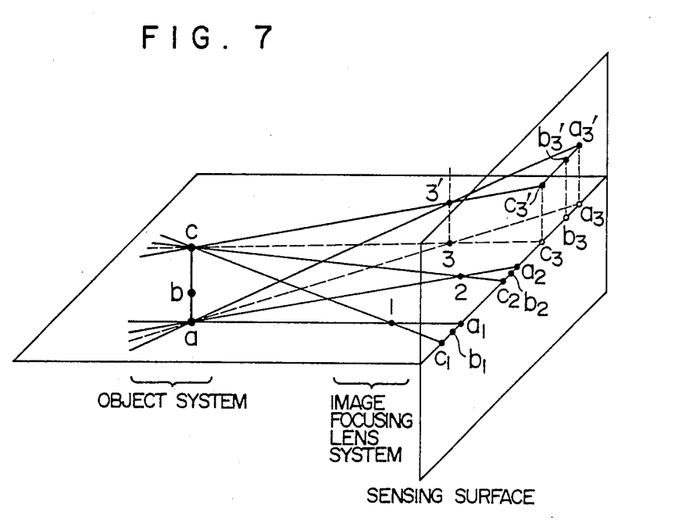

The hatched area of FIG. 6 can be eliminated by placing the third focusing system at a position deviating from the plane, in which the first and second focusing systems and the line segment a c lie, as shown in FIG. 7. In FIG. 7, reference symbol 3' designates the new position of the third focusing system. In this case, a triangular region bounded by two straight lines connecting the third focusing system with both ends of the line segment a c and their extensions intersects with the above plane only at the line segment a c. Accordingly, the hatched area is extinguished.

Further, it can be readily known that the hatched portion can be made small by additionally disposing the fourth focusing system in the plane which contains the line segment a c and the first, second and third focusing systems, instead of deviating the third focusing system from the plane.

Also, in a case where an object system has a planar shape, the hatched portion can be reduced by changing the geometrical arrangement of the focusing systems or by increasing the number of focusing systems. Further, when the planar shape is converted into a linear shape by preprocessing, such as edge extraction, or by decreasing the size of the plate, the portion can be made extremely small.

The broken line P which appears in FIG. 3 and corresponds to the virtual object point p, can be removed by utilizing the brightness information of bright lines. Now, let us consider a case where image points of the same object point formed by three focusing systems are equal in brightness to one another, as shown in FIG. 3. When at least one of three bright lines extracted by a straight line is different in brightness from the remaining bright lines, this straight line is eliminated. Bright lines extracted by each of the broken lines A, A', B and C have the same brightness, but two bright lines a1 and a'2 of three bright lines a1, a'2 and b3 extracted by the broken line P are different in brightness from the remaining bright line b3. Accordingly, the broken line P is eliminated.

The processing for eliminating an unwanted straight line can be carried out in a short time by software or hardware. Further, this processing and the above-mentioned positioning processing can be combined so as to be simultaneously performed.

Next, let us consider a case where image points (namely, bright lines) of the same object point formed by a plurality of focusing systems do not have the same brightness but the reflectivity of an object point (or the radiant intensity of a luminous object point) is equal in all directions. The brightness of a bright line on the sensing surface is inversely proportional to the square of the distance between the object point and the bright line. Accordingly, when brightness values each obtained by multiplying the brightness of one of bright lines extracted by a straight line by the square of the corresponding distance, are not equal, the straight line is eliminated.

In most cases, the above-mentioned conditions with respect to brightness are satisfied. Even in a case where the reflectivity of an object point varies with direction, if the extent of variations in reflectivity is previously known, the brightness of each of bright points extracted by a straight line will be corrected by the above information, and thus it will be judged on the basis of the corrected brightness values of the bright lines whether the straight line is to be eliminated or not. Even in a case where the distance correction or the correction for variations of the reflectivity of an object point with direction is necessary, an unwanted straight line can be readily eliminated in a short time by software or hardware, as in a case where bright points of the same object point formed by a plurality of focusing systems have the same brightness.

It is to be noted that the prior art using a pattern matching technique determines corresponding points on the assumption that bright lines on the sensing surface are all equal in brightness.

After corresponding points have been determined in the above-mentioned manner, both the information on the positions of at least two of three bright lines indicated by the corresponding points, on the sensing surface, and the information on the geometrical positional relation between the focusing systems and the sensing surface are used for obtaining two-dimensional distance information of an object point, that is, the distance between the object point and the sensing surface in the direction of depth and one or two horizontal azimuth angles. The two-dimensional distance information thus obtained is combined with the vertical azimuth angle information which is obtained independently of the above two-dimensional distance information, to obtain three-dimensional distance information of the object point.

The processing for obtaining each of the two-dimensional distance information and the three-dimensional distance information is a processing based upon simple abgebraic equations, and can be readily performed in a short time. The whole quantity of processing necessary for obtaining three-dimensional distance information of an object system is proportional to the number of object points included in the object system.

Now, explanation will be made of a first embodiment of a method of forming a three-dimensional stereo vision in accordance with the present invention, by reference to FIG. 4.

Figure 4:
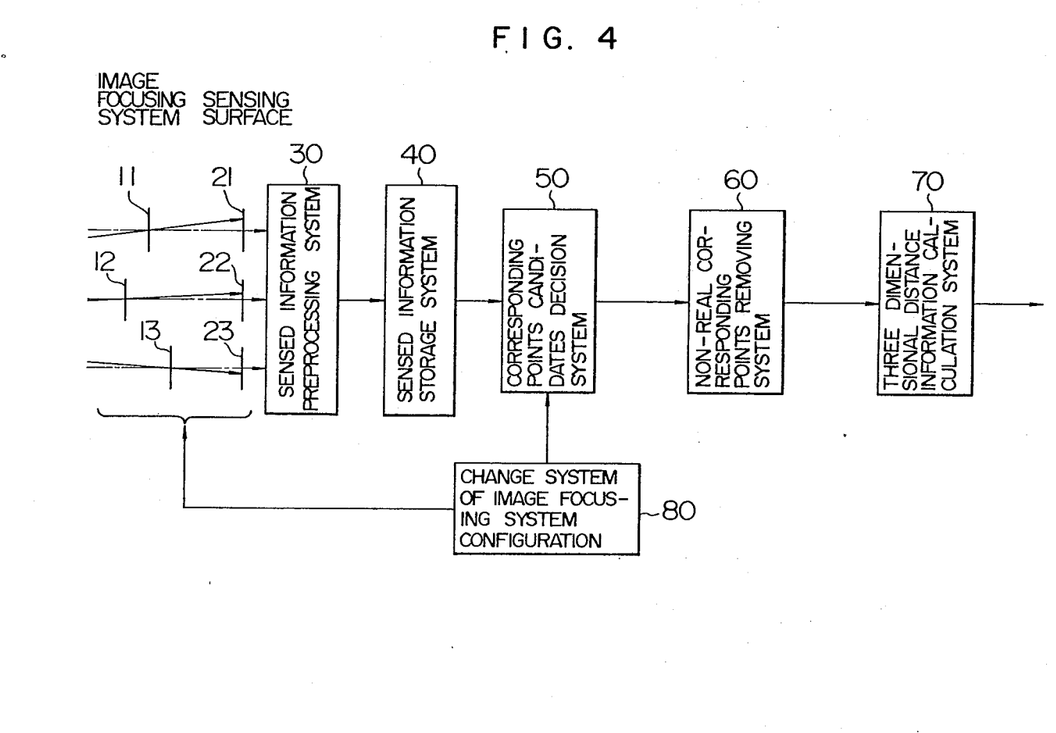
FIG. 4 is a block diagram showing an apparatus for carrying out the first embodiment of a method of forming a three-dimensional stereo vision in accordance with the present invention.

The first embodiment is carried out by an apparatus which, as shown in FIG. 4, includes image focusing systems 11 to 13 each formed of a lens or mirror, image sensing surfaces 21 to 23, a detected information preprocessing system 30, a detected information storage system 40, a candidate-for-corresponding-point decision system 50, a false-corresponding-point removing system 60, a three-dimensional distance information calculation system 70, and a configuration change system 80 for changing the configuration of the image focusing systems 11 to 13.

The image focusing systems 11 to 13 are not always required to lie on a straight line parallel to the sensing surfaces 21 to 23, but the positions of the image focusing systems can be changed by the configuration change system 80 so that a plane containing the image focusing systems 11 to 13 makes a desired angle with the image sensing surfaces 21 to 23.

The images of an object system which are formed on the sensing surfaces 21 to 23 by the focusing systems 11 to 13, are sent to the detected information preprocessing system 30, which corrects errors due to distortions and various aberrations in the focusing system, and extracts bright lines which satisfy a brightness or color condition required for extracting edges or obtaining three-dimensional distance information, if necessary. The image information thus obtained is sent to the detected information storage system 40. When it is necessary to reduce false corresponding points by using four or more image focusing systems, the configuration of the focusing systems 11 to 13 and sensing surfaces 21 to 23 is changed by the configuration change system 80, and the image information obtained on the basis of the new configuration is also sent to the detected information storage system 40 through the preprocessing system 30. Next, the candidate-for-corresponding-point decision system 50 extracts candidates for corresponding points from a multiplicity of image points stored in the storage system 40, by making use of a special geometrical relation, as mentioned in "SUMMARY OF THE INVENTION". The extracted candidates are sent to the false-corresponding-point removing system 60, in which candidates corresponding to a false (namely, non-existing) object point are removed from the extracted candidates by making use of a brightness condition or others, as mentioned in "SUMMARY OF THE INVENTION". The remaining candidates are sent to the three-dimensional distance information calculation system 70, to obtain the three-dimensional distance information of the object system in a manner mentioned in "SUMMARY OF THE INVENTION".

According to the apparatus of FIG. 4, the configuration of the focusing systems 11 to 13 and sensing surfaces 21 to 23 can be freely changed, and moreover, the information obtained on the basis of the new configuration is also stored. Thus, the apparatus of FIG. 4 can produce the same effect as an apparatus provided with four or more focusing systems, and hence can greatly reduce the redundancy in extracting candidates for corresponding points, no matter what structure the object system may have.

Next, explanation will be made of a second embodiment of a method of forming a three-dimensional stereo vision in accordance with the present invention, by reference to FIG. 5.

Figure 5:
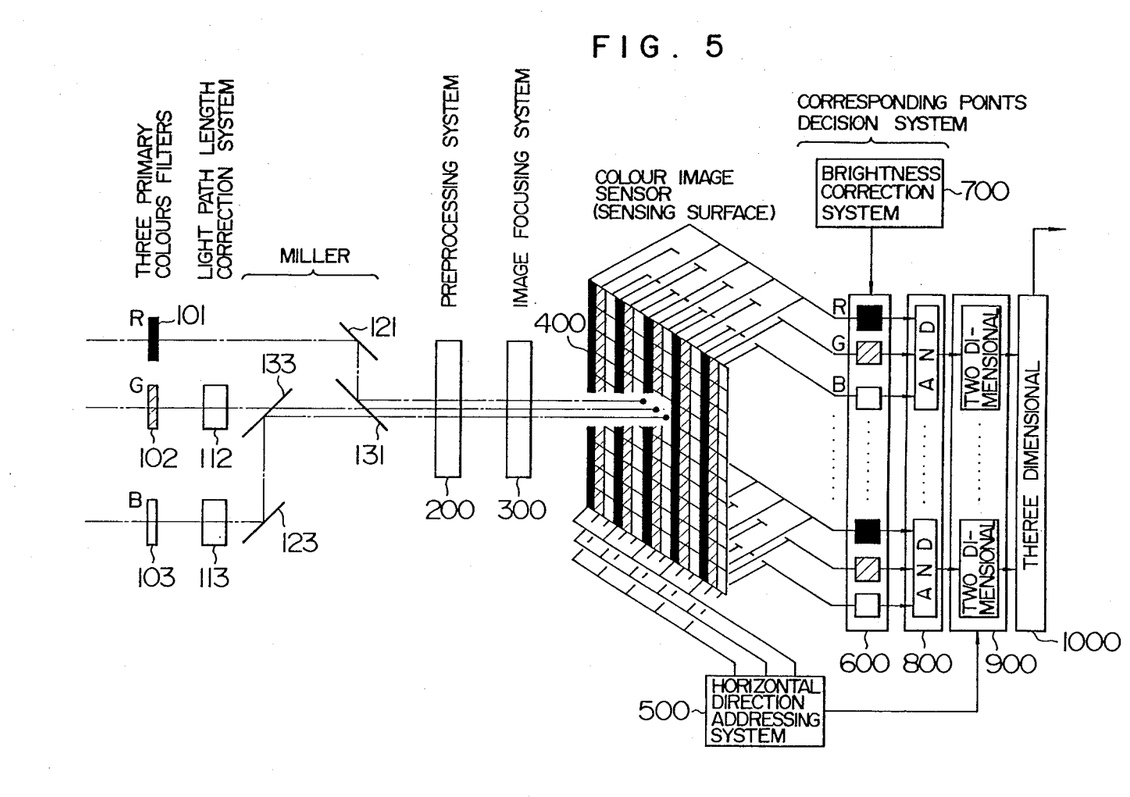
FIG. 5 is a block diagram (partly pictorial and partly schematic) showing an apparatus for carrying out the second embodiment of a method of forming a three-dimensional stereo vision in accordance with the present invention.

The second embodiment is carried out by an apparatus which, as shown in FIG. 5, includes color filters 101 to 103 corresponding to three primary colors, optical path length correction systems 112 and 113, mirrors 123, 133, 121 and 131, a preprocessing system 200, an image focusing system 300, a color image sensor 400, a horizontal addressing system 500, a brightness correcting circuit group 600, a brightness correction system 700, an AND circuit group 800, a two-dimensional distance information calculation system 900, and a three-dimensional distance information calculation system 1000.

The color filters 101, 102 and 103 transmit red light, green light and blue light, respectively, and correspond to three primary color filters mounted on the color image sensor 400. The color filters 101 to 103, the optical path length correction systems 112 and 113, and the mirrors 123, 133, 121 and 131 are disposed so that the light paths from the color filters 101 to 103 to the color imaee sensor 400 have the same optical path length, and respective optical axes of three light beams from the color filters 101 to 103 lie in the same horizontal plane and are spaced apart from one another at the light receiving surface of the color image sensor 400 by an amount corresponding to the width (in a horizontal direction) of each of the color filters mounted on the color image sensor 400. As shwwn in FIG. 5, each of the mirrors 133 and 131 can transmit light incident upon the back surface thereof.

Referring to FIG. 5, light which is emitted or reflected from an object system and passes through an optical system which includes the color filters 101 to 103, the optical path length correction systems 112 and 113 and the mirrors 123, 133, 121 and 131, is subjected to necessary brightness modification processing and polarization processing in the preprocessing system 200, and then is focused on the color image sensor 400 by the image focusing system 300. The color image sensor 400 is able to be addressed by horizontal direction addressing system 500 in respective colors so that three pixels adjacent to one another and corresponding to three colors in a horizontal direction which are provided with the red, green and blue filters, can be separately addressed by three address lines prepared independently for each color and pixels arranged in a vertical direction and receiving light of the same color can be simultaneously addressed. When the addressing for the color image sensor 400 is made in a horizontal direction and in a predetermined order, pixels corresponding to an address simultaneously deliver information corresponding to the color filters mounted on these pixels, and the above information is sent to the brightness correcting circuit group 600. The circuit group 600 includes three correcting circuits for each of pixel layers arranged in a vertical direction. The output of each pixel included in the color image sensor 400 is modified in accordance with that circuit constant of each correcting circuit which is specified by the brightness correction system 700, and then three color outputs from three pixels adjacent to one another in a horizontal direction are applied to one of AND circuits included in the AND circuit group 800. The brightness correction system 700 gives each correcting circuit of the brightness correcting circuit group 600 a circuit constant necessary for the correction of brightness balance among three primary colors, the brightness correction resulting from the characteristics of the object system, and the classification of brightness into a plurality of levels. Three color outputs having been subjected to the brightness correction are applied to one AND circuit of the AND circuit group 800. When the three color outputs lie in a predetermined brightness range, the AND circuit delivers ON-information. When at least one of the three color outputs does not lie in the predetermined brightness range, the AND circuit delivers OFF-information. The ON- or OFF-information thus obtained is applied to one two-dimensional distance information calculation circuit of the two-dimensional distance information calculation system 900. When ON-information is applied to the above calculation circuit, the presence of an object point is known, and the two-dimensional distance information of the object point is obtained on the basis of the address information from the horizontal addressing system 500 by the method mentioned in "SUMMARY OF THE INVENTION". When the OFF-information is applied to the two-dimensional distance information calculation circuit, the absence of an object point is indicated, and thus no processing is carried out. The above two-dimensional distance information obtained in each of pixel layers arranged in the vertical direction is sent to the three-dimensional distance information calculation system 1000, to be used for obtaining the three-dimensional distance information of the object system.

As can be seen from the above explanation, according to the second embodiment, data from pixel layers arranged in the vertical direction are processed in parallel, and hence the processing time is greatly shortened. Further, the whole processing can be carried out by hardware, and hence not only the productivity and reliability are improved but also the processing speed is increased. Furthermore, only the light receiving surface of a single color image sensor is used as the image sensing surface, and hence the apparatus for carrying out the second embodiment is simple in structure and can be constructed at a low cost.

As has been explained in the foregoing, according to the present invention, a method of forming a three-dimensional stereo vision is provided in which the processing time is short, and the fundamental error dependent upon the spatial distribution of object points can be avoided.

Further, the above mentioned according to the present invention has the following advantages.

(1) Even when an object system has a special brightness pattern, precise distance information can be formed by appropriately setting the number and configuration of image focusing systems.

(2) When brightness information, color information and others are used together with position information of each image point, unwanted data is removed, and thus the processing can be performed more accurately and at a higher speed.

(3) Unlike a conventional pattern matching technique in which the whole of an object system is processed at once, it is possible to specify a plurality of limited ranges of distance in the direction of depth, a plurality of limited ranges of horizontal azimuth angle and a plurality of limited ranges of vertical azimuth angle in a desired order. Accordingly, only the three-dimensional distance information of that portion of an object system which exists in the specified, limited ranges of the above factors, can be obtained, and further the presence or absence of an object point in the above portion can be judged. Thus, efficient processing can be made.

(4) Unlike the conventional pattern matching technique in which the whole of an object system is processed at once, it is possible to determine corresponding points for an object point independently of corresponding points for another object point. Accordingly, even when image information contains a local error, only a portion of the processing for obtaining three-dimensional distance information is affected by the error, and the accurate three-dimensional distance information of object points which have no connection with the erroneous image information, can be obtained.

(5) The processing speed can be greatly improved by using parallel processing at a portion of the whole processing.

(6) When preprocessing such as the extraction of edges included in an object system, is carried out, the number of bright lines used is greatly reduced, and the processing speed is further improved.

(7) The number of image focusing systems and the number of image sensing areas are required to be three or more in effect. Accordingly, an apparatus for carrying out the method according to the present invention may be constructed so that a single image focusing system and a single image sensing surface can be used in a time-divisional fashion.

In the foregoing explanation, the image of an object system is formed by an optical system. However, the present invention is not limited to the optical system, but is applicable to various propagation systems such as electromagnetic wave systems other than the optical system, an accoustic system, an elastic wave system, and a particle beam system (for example, the electron beam of an electron microscope).

We claim:

1. A method, of obtaining three-dimensional distance information, comprising the steps of:
    forming images of an object system on an image sensing surface by using at least three image focusing systems so that at least three object images of the object system are formed on respective image sensing areas;
    correlating the image point of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and
    obtaining the three-dimensional distance information of said object point by using information relating to the positions of at least two of the corresponding image points on the image sensing areas and information relating to the geometrical positional relationship between said two corresponding image points and the image focusing systems, wherein said correlating of the image points comprises allocating the object images formed on said respective image sensing areas to respective imaginary planes which are superimposed with a spatial relationship corresponding to the spatial relationship of said image focusing systems, and detecting those image points on the imaginary planes which lie on the same straight line.

2. A method of obtaining three-dimensional distance information, comprising the steps of:
    forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein correlating of the image points comprises detecting image points in respective image sensing areas which satisfy the relationship that the ratio of the distance between first and second image points of the same object point in respective first and second image sensing areas to the distance between said second and a third image point of the same object point in respective second and third sensing areas is equal to the ratio of the distance between first and second focusing system to the distance between said second and a third focusing system.

3. A method of obtaining three-dimensional distance information, comprising the steps of:

forming images of an objection at least one image sensing surface by using at least three image focusing systems so that at least three object images of the object are formed on said image sensing surface;

determining correspondence between image points of said images formed on said image sensing surface and object points on said object by using a geometrical relationship in which a shape is formed by joining said at least three image focusing systems, which shape moves toward said image sensing surface in parallel while maintaining a similar form so as to form a similar shape disposed between said shape and said image sensing surface, each of the image points corresponding to the object points existing on points of intersection of said image sensing surface and straight lines passing through vertices of said shape and the corresponding vertices of said similar shape; and obtaining three-dimensional distance information of said object points by using information relating to the positions of at least two of said image points formed on said image sensing surface corresponding to a certain object point and information relating to the geometrical positional relationship between said two corresponding image points and said image focusing systems.

4. A method according to claim 1, wherein each of said image sensing areas are formed on the same one-dimensional image sensing surface.

5. A method according to claim 1, wherein single image focusing system and a single image sensing surface are fixed successively at least at three different positions and the image of said object system is formed on said image sensing surface so as to produce at least three object images by using the formed image data on said image sensing surface.

6. A method according to claim 1, wherein a single image focusing system is fixed successively at different positions so that the image of said object system can be formed on each of at least three image sensing surfaces.

7. A method according to claim 1, wherein said image focusing systems are arranged on a straight line.

8. A method according to claim 1, wherein said image focusing systems are arranged in a plane surface.

9. A method according to claim 1, wherein said image focusing systems are arranged in a curved surface.

10. A method according to claim 1, wherein said image focusing systems are arranged on a straight line at regular intervals.

11. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein said image focusing systems are arranged in a plane surface so as to form a regular polygon.

12. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein said image focusing systems are arranged on a straight line at random.

13. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein said image focusing systems are arranged in a plane surface so as to form a ordinary polygon.

14. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein said image focusing systems are arranged in a plane surface parallel to said image sensing surfaces.

15. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between aaid image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein said image focusing systems are arranged in a plane surface which is oblique with respect to said image sensing surfaces.

16. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein a plurality of operations corresponding to a range of vertical azimuth angles for correlating points are performed in parallel.

17. A method of obtaining three-dimensional distance information, comprising the steps of:

forming images of an object system on an image sensing surface by using at least three image focusing systems so that at least three object images of the object system are formed on respective image sensing areas;

correlating the image points ff an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two correšponding image points and the image focusing systems, wherein a plurality of operations corresponding to a range of horizontal azimuth angles and a range of vertical azimuth angles for correlating points are performed in parallel.

18. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein corresponding points are determined in a limited range of vertical azimuth angles and in a limited range of horizontal azimuth angles.

19. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein a plurality of limited ranges of vertical azimuth angles and a plurality of limited ranges of horizontal azimuth angles are specified in a desired order, and corresponding points are obtained in each specified, limited range of vertical azimuth angles and in each specified, limited range of horizontal azimuth angles.

20. A method of obtaining three-dimensional distance information, comprising the steps of:

forming images of an object system on an image sensing surface by using at least three image focusing systems so that at least three object images of the object system are formed on respective image sensing areas;

correlating the image points of an object point which are formed on said respective image sensing areas by said image focusing systems by using a relationship which exists between the geometrical positional relationships among said image points and the geometrical positional relationships among said image focusing systems themselves and between said image focusing systems and said image sensing areas; and obtaining the three-dimensional distance information of said object point by using information relating to the positions of at least two of the corresponding image points on the image sensing areas and information relating to the geometrical positional relationship between said two corresponding image points and the image focusing systems, wherein image points corresponding to a non-existing object point are removed on the basis of brightness information obtained on said image sensing areas.

21. An apparatus for obtaining three-dimensional distance information, comprising:

three color filtering means corresponding to three primary colors and spaced apart from one another, for dividing light from an object system into three light means;

an image focusing system for forming the image of an object system by using said light means of said object system received from said color filtering means;

image sensing means formed of a color image sensor, said color image sensor being provided with three kinds of color filters corresponding to said three color filtering means in such a manner that the three color filters are repeatedly mounted on pixels which form said color image sensor, in a horizontal direction, to detect said three light beams separately, said pixels being scanned in a horizontal direction;

optical deflection means for making the optical axes of said light beams from said three color filtering means parallel to the axis of said image focusing system, for juxtaposing said optical axes of said light beams in a direction parallel to a horizontal pixel layer of said color image sensor so that said optical axes deviate from one another, and for providing the same optical path length between each of said three color filtering means and the image sensing surface of said image sensing means;

horizontal addressing means for taking out information from pixels included in a horizontal pixel layer of said color image sensor in such a manner that a plurality of pixel groups each including three pixels which are provided with said three color filters, are successively addressed in a predetermined order, and the ouputs of said three pixels of each pixel group are simultaneously taken out;

detection means for delivering ON-information when said three light beams from said three color filtering means have a brightness value within a predetermined range, at those three pixels of a horizontal pixel layer which are addressed by said horizontal addressing means, and for delivering OFF-information when at least one of said three light beams does not have a brightness value within said predetermined range at one of said three pixels;

two-dimensional distance information calculation means for obtaining two-dimensional distance information which includes the distance from said image sensing surface to said object system in the direction of depth and at least one horizontal azimuth angle, from the horizontal address information on said color image sensor; and three-dimensional distance information calculation means for obtaining three-dimensional distance information which includes said two-dimensional distance information of said object system and a vertical azimuth angle, by using the vertical address information on said color image sensor.

22. An apparatus according to claim 21, further comprising a brightness correction system for effecting brightness correction for outputs of three pixels which are included in one pixel group and provided with said three color filters.

23. An apparatus according to claim 21, wherein a contour extracting element is disposed in front of said image sensing surface.

24. An apparatus according to claim 21, wherein three polarizers and three analyzers for detecting said three light beams separately, perform substantially the same function as said three color filtering means and said three color filters, respectively.

25. A method according to claim 3, wherein when said at least three image focusing systems are arranged on a line and said line is parallel with said image sensing surface, and wherein determination of said correspondency is made by using the geometrical relationship that a ratio between distances of adjacent image focusing systems is the same as the ratio of distances of image points corresponding to the certain object point.

26. A method according to claim 3, wherein said at least three image focusing systems are arranged on a common plane and said plane is perpendicular to said image sensing surface.

27. A method according to claim 3, wherein said at least three image focusing systems are arranged on a common plane parallel with said image sensing surface so that all of the image points corresponding to a certain object point exist on vertices of a figure on said image sensing surface, said figure being similar to said shape formed on said plane.

28. An apparatus for obtaining three-dimensional distance information, comprising:

three color filtering means corresponding to three primary colors and spaced apart from one another, for dividing light from an object system into three light means;

an image focusing system for forming the image of an object system by using said light means of said object system received from said color filtering means;

image sensing means formed of a color image sensor, said color image sensor being provided with three kinds of color filters corresponding to said three color filtering means in such a manner that the three color filters are repeatedly mounted on pixels which form said color image sensor, in a horizontal direction, to detect said three light beams separately, said pixels being scanned nn a horizontal direction;

optical deflection means for making the optical axes of said light beams from said three color filtering means parallel to the axis of said image focusing system, for juxtaposing said optical axes of said light beams in a direction parallel to a horizontal pixel layer of said color image sensor so that said optical axes deviate from one another, and for providing the same optical path length between each of said three color filtering means and the image sensing surface of said image sensing means;

horizontal addressing means for taking out information from pixels included in a horizontal pixel layer of said color image sensor in such a manner that a plurality of pixel groups each including three pixels which are provided with said three color filters, are successively addressed in a predetermined order, and the outputs of said three pixels of each pixel group are simultaneously taken out;

detection means for delivering ON-information when said three light beams from said three color filtering means have a brightness value within a predetermined range, at those three pixels of a horizontal pixel layer which are addressed by said horizontal addressing means, and for delivering OFF-information when at least one of said three light beams does not have a brightness value within said predetermined range at one of said three pixels;

two-dimensional distance information calculation means for obtaining two-dimensional distance information which includes two horizontal azimuth angles, from the horizontal address information on said color image sensor; and three-dimensional distance information calculation means for obtaining three-dimensional distance information which includes said two-dimensional distance information of said object system and a vertical azimuth angle, by using the vertical address information on said color image sensor.

* * * * *